US007720688B1

(12) United States Patent
Baron et al.

(10) Patent No.: US 7,720,688 B1
(45) Date of Patent: May 18, 2010

(54) METHOD FOR GENERATING REAL-ESTATE TRANSFER DOCUMENTS ON AN UNASSOCIATED SECOND WEBSITE USING SINGLE SET OF USER PROVIDED INFORMATION

(75) Inventors: William Baron, Palm Beach Gardens, FL (US); Eric Dudas, Naperville, IL (US)

(73) Assignee: Titlevest Agency, Inc., New York, NY (US)

( * ) Notice: Subject to any disclaimer, the term of this patent is extended or adjusted under 35 U.S.C. 154(b) by 0 days.

(21) Appl. No.: 11/388,663

(22) Filed: Mar. 24, 2006

(51) Int. Cl.
G06Q 10/00 (2006.01)
(52) U.S. Cl. .......................................................... 705/1
(58) Field of Classification Search ........................ 705/1
See application file for complete search history.

(56) References Cited

U.S. PATENT DOCUMENTS

| | | | | |
|---|---|---|---|---|
| 5,043,891 | A * | 8/1991 | Goldstein et al. | 715/234 |
| 5,432,614 | A * | 7/1995 | Yamamoto | 358/403 |
| 6,199,079 | B1 | 3/2001 | Gupta et al. | 707/507 |
| 6,314,415 | B1 * | 11/2001 | Mukherjee | 706/47 |
| 6,327,598 | B1 | 12/2001 | Kelley et al. | 707/513 |
| 6,345,278 | B1 | 2/2002 | Hitchcock et al. | 707/100 |
| 6,490,601 | B1 | 12/2002 | Markus et al. | 707/507 |
| 6,589,290 | B1 | 7/2003 | Maxwell et al. | 715/507 |
| 6,684,196 | B1 * | 1/2004 | Mini et al. | 705/26 |
| 6,874,120 | B2 | 3/2005 | Le et al. | 715/507 |
| 6,910,179 | B1 | 6/2005 | Pennell et al. | 715/507 |
| 7,085,735 | B1 * | 8/2006 | Hall et al. | 705/26 |
| 2002/0062277 | A1 * | 5/2002 | Foster et al. | 705/38 |
| 2002/0138413 | A1 * | 9/2002 | Creamer et al. | 705/38 |
| 2003/0051141 | A1 * | 3/2003 | Veyrassat | 713/170 |

(Continued)

FOREIGN PATENT DOCUMENTS

JP 2002150176 A * 5/2002

OTHER PUBLICATIONS

ZipForm Online User Guide, Dec. 20, 2003, www.zipform.com, printed through www.archive.org.*

(Continued)

*Primary Examiner*—Naresh Vig
(74) *Attorney, Agent, or Firm*—Mintz, Levin, Cohn, Ferris, Glovsky and Popeo, PC

(57) ABSTRACT

Embodiments of the present invention are directed to methods and systems for generating one or more real estate transfer and/or closing documents on a website with a set of information input by a user, using an unrelated website and/or application program. In particular, some embodiments apply such a method/system to generate one or more real-estate transfer/closing documents for a particular real-estate transaction on a website. For example, a method is disclosed for generating such documents which may include providing an application program for receiving first information from a user to post to an unrelated website. The application program may be operational on at least one of a user client computer or server computer and the website preferably includes functionality for generating one or more documents for a particular real-estate transaction. Moreover, the one or more documents preferably include at least a portion of the first information and the first information preferably include information directly related to the particular real-estate transaction. The method preferably also includes automatically generating the one or more real-estate transfer documents on the website using the application program.

10 Claims, 20 Drawing Sheets

U.S. PATENT DOCUMENTS

2003/0140053 A1* 7/2003 Vasey .......................... 707/100
2004/0060005 A1* 3/2004 Vasey .......................... 715/513
2004/0261025 A1 12/2004 Rizk et al. .................. 715/530
2005/0060234 A1* 3/2005 Reahard ....................... 705/19

OTHER PUBLICATIONS

ACRIS Frequently Asked Questions labeled as ACRIS, Jan. 19, 2003, ver 1.1.*

Wisconsin Realtors Association (labeled as WRA), Feb. 2003, WRA Online Publications, vol. 19, No. 5.*

Daniel Geiger, Bill Wins Title for Taking the Strain out of Taxes, May 11, 2005, Real Estate Weekly.*

Say goodbye to paper—remote, electronic document registration becomes reality for Middlesex County in Ontario, Dec. 30, 1999, Canada NewsWire.*

Coming soon to a PC near your: Electronic Document Registration of Land Titles, Nov./Dec. 1999, Teranet Land Information Systems, Inc.*

Information on ZipForm Online, 2003, www.zipform.com, printed through www.archive.org.*

Laurie Wiliams, e-Filing Service Offers Simple Online Filing of Income, Dec. 10, 2004, Free Press release.*

* cited by examiner

METHOD FOR GENERATING REAL-ESTATE TRANSFER DOCUMENTS ON AN UNASSOCIATED SECOND WEBSITE USING SINGLE SET OF USER PROVIDED INFORMATION

FIELD OF THE INVENTION

Embodiments of the present invention are directed to methods, systems, applications, interfaces and computer readable media, for creating and specifying content for one or more documents on a website.

BACKGROUND OF THE INVENTION

For every real estate transaction, one or more legal documents are necessary to conduct the transaction. Such forms include contract of/for purchase forms, agreement of sale form, sales agreement, purchase contract, sales contract, title, and other miscellaneous forms such as transfer forms and tax forms.

In that regard, certain jurisdictions require the filing of certain forms for real-estate transactions. For example, New York City (NYC) requires that a real property tax return, a real property transfer report and a real estate tax return be filed with most real-estate transactions. In an effort to streamline the preparation and filing of such forms, NYC provides a website (ACRIS), which allows buyers/sellers to input property, grantee/grantor, legal representation, property information, as well as sales costs ("transaction information").

However, a problem exists with such a website (such as ACRIS) in that a user must input substantially the same data for a particular transaction multiple times. Thus, there exists a need for providing functionality to allow a user to input transaction information preferably a single time, to generate one or more forms.

Moreover, in using ACRIS, for example, a user must know exactly what forms to fill out and what data is required for a particular type of property conveyed, conditions of transfer, and the like.

In addition to the above-noted real-estate example, the problem also exists for other subject areas where the generation of forms occurs, and users must input substantially the same information for each generated form.

SUMMARY OF THE INVENTION

Embodiments of the present invention are directed to methods, applications, websites and computer instructions, whether stored in a random access memory or contained within a computer readable medium, which allow a user to input preferably a single set of information using a software application or a via a first website for completing one or more (usually a plurality) forms generated on a second website.

Embodiments of the present invention address the above noted problems. In particular, some embodiments of the present invention provide intuitive selection options which auto-fill and select all required fields and data, and produce the requisite forms. For example, in one embodiment, if a user selects a property type as "Single Residential Coop Unit", and enters data in for such a transaction, the user need not have to enter in separate information for the type of transfer, type of interest, whether a document is being recorded, a condition of conveyance, and the like. These issues are automatically taken care of for the particular type of transaction.

In some embodiments of the present invention, the above embodiments are directed at generating real-property, real estate documents (e.g., transfer documents, recording documents, closing documents, and the like), and in particular, at creating real-property transfer documents which can be printed out, filed electronically, and/or stored/downloaded.

Accordingly, in one embodiment of the present invention, a method for generating one or more real-estate transfer documents for a particular real-estate transaction is provided. The method may include providing an application program (and/or one or more application program interfaces) for receiving first information from a user to post to an unrelated website. The application program may be operational on at least one of a user client computer or server computer and the website preferably includes functionality for generating one or more documents for a particular real-estate transaction. The one or more generated documents preferably include at least a portion of the first information and the first information comprises information directly related to the particular real-estate transaction. The method may also include automatically generating the one or more real-estate transfer documents on the website using the application program.

In the above embodiment, as well as other disclosed embodiments, the automatic generation of the one or more real estate documents may include the application program opening at least one or more URLs associated with the website. Each URL is associated with a particular task for generating the one or more documents on the website. In addition, the application program preferably posts (e.g., http query) at least a portion of the first information to each opened URL and receives a response to each posting from the opened URL.

In the above noted embodiment, the application program may include one or more application program interfaces (API) for posting information to each of the opened URLs of the website to generate the one or more real-estate transfer documents. Moreover, the application program may reside on a server and correspond to another website, unrelated to the website for generating the one or more documents.

In yet another embodiment of the present invention, a method for generating one or more real-estate transfer documents for a particular real estate transaction is provided and may include providing a first website for receiving first information from a user to post to one or more URLs of an unrelated second website using one or more application program interfaces (APIs). The second website preferably includes functionality for generating the one or more real-estate transfer documents for a particular real-estate transaction. The one or more real-estate transfer documents include at least a portion of the first information and the first information comprises information directly related to the particular real-estate transaction. The method may also include opening at least one or more URLs associated with the second website, each URL corresponding with a particular task for generating the one or more real-estate transfer documents on the second website and posting at least a portion of the first information to each of the opened URLs. A response to the posted information may include the generated one or more real-estate transfer documents.

In yet another embodiment of the present invention, a method for generating a plurality of different documents on a website may include providing an application program (and/or one or more application program interfaces) for receiving first information from a user to post to an unrelated website to generate a plurality of different documents. The application program may be operational on at least one of a user client computer or server computer and the website preferably includes functionality for generating the plurality of different documents for a particular subject. The plurality of documents being generated preferably include at least a portion of the first information and the first information comprises information directly related to the particular subject. The method preferably also includes automatically generating the plurality of different documents on the website using the application program and using at least a portion of the first information.

Another embodiment of the present application is directed to a system for generating one or more real-estate transfer documents for a particular real-estate transaction. The system preferably includes an application program (and/or one or more application program interfaces) for receiving first information from a user to post to an unrelated website. The application program may be operational on at least one of a user client computer or server computer and the website includes functionality for generating one or more documents for a particular real-estate transaction. The one or more documents including at least a portion of the first information and the first information comprises information directly related to the particular real-estate transaction. The method also preferably includes generating means for automatically generating the one or more real-estate transfer documents on the website using the application program.

In yet another embodiment of the invention includes a system for generating one or more real-estate transfer documents for a particular real-estate transaction. The system comprises a server having an application program (and/or one or more application program interfaces) for receiving first information from a user to post to an unrelated website. The application program may be operational on at least one of a user client computer or server computer and the website includes functionality for generating one or more documents for a particular real-estate transaction. The one or more documents include at least a portion of the first information and the first information comprises information directly related to the particular real-estate transaction. The application program may be operable to automatically generate the one or more real-estate transfer documents on the website.

It is a particular feature of some embodiments of the present invention, that the application program/interface can automatically determine which documents are necessary for generation, based on the data input from the user.

Other embodiments of the present invention include computer readable media, application programs and application program interfaces corresponding to any one or more of the above noted embodiments.

These and other embodiments, advantages and objects of the invention will be more apparent with reference with the following detailed description and attached drawings, a brief description of which is set out below.

BRIEF DESCRIPTION OF THE FIGURES

FIGS. 13A-13C illustration portions of is a screenshot of an input webpage, illustrating the fields of transaction information that may be entered at the first website for generating forms at the second website according to some embodiments of the present invention.

DETAILED DESCRIPTION OF THE EMBODIMENTS

Figure 1A:
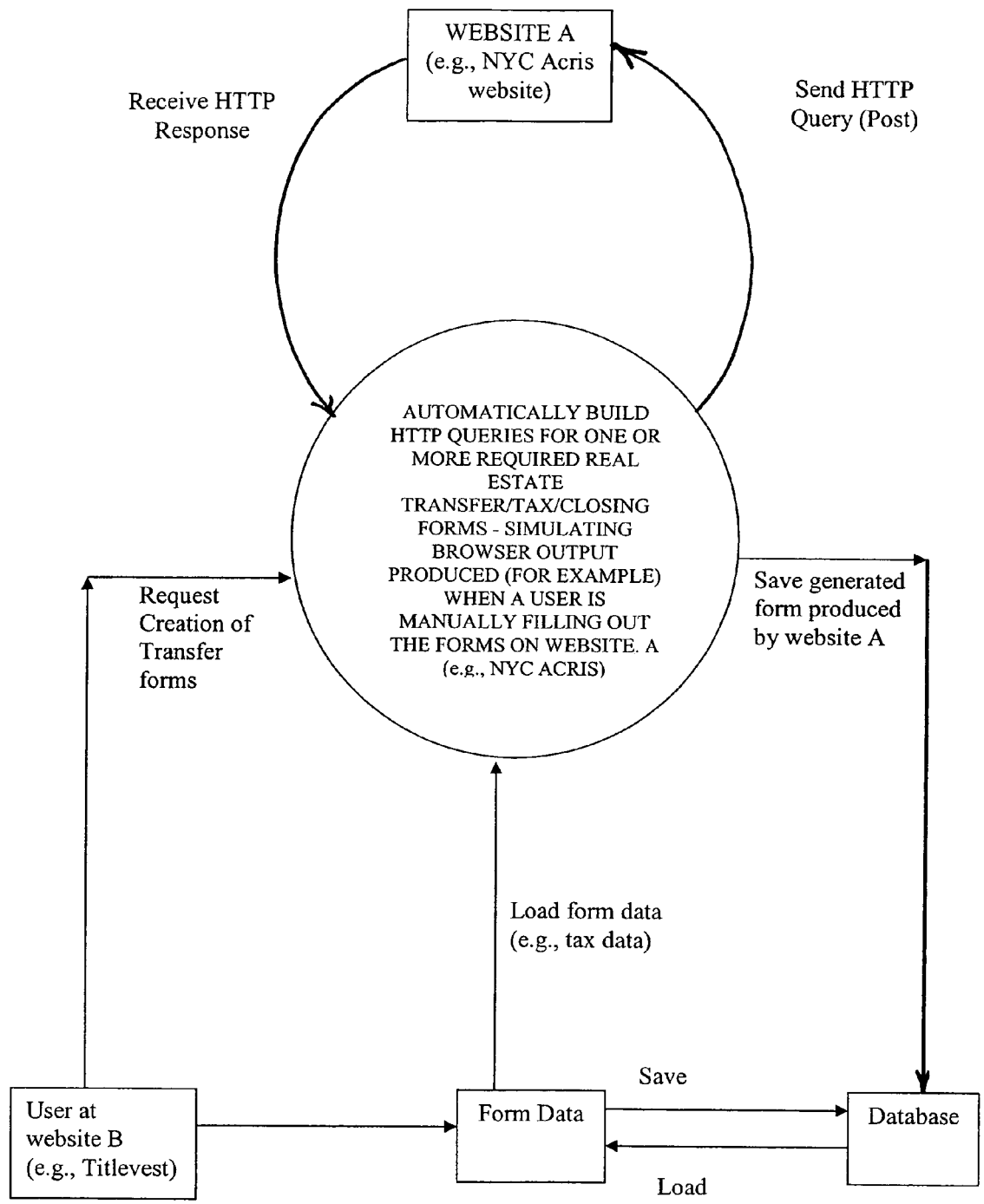
FIG. 1A is flow diagram of an overall system operation according to some of the embodiments of the present invention.

Exemplary embodiments of the present invention will now be described for generating legal transfer documents for the conveyance (for example) of real-property, including associated tax forms for local and state governments (federal government, if applicable), property deeds, title deeds, contracts of sale, and the like. Particular preferred embodiments are described below with reference to real-estate transactions for New York City (NYC). However, these exemplary embodiments represent but one possible application of the functionality (e.g., URL—http/query, response model) of the present invention.

The functionality of some of the embodiments of this invention may include any use, generally or specifically, to the generation of one or more documents (of any type) hosted on a first website, from another unrelated second website or client resident software application. Some of the preferred embodiments of the present invention accomplish this functionality using API routines and subroutines (as shown in the attached figures) and, as will be described below, generally follow the following process: opening a URL associated with the task at hand on the first website (e.g., a webpage having fields for generation of a particular document/form), posting a query to the URL (generally with information to be placed into a document), reading a response thereof, and optionally, obtaining data from the first website. Data may be obtained from the first website through any known method according to one of skill in the art, including, for example screen scraping and various types of data interfaces (e.g., XML; see http://en.wikipedia.org/w/index.php?title=XML&oldid=44955473, www.wikipedia.com; "XML"; Mar. 22, 2006; page version ID no. 44955473, the entire disclosure of which is herein incorporated by reference).

In some embodiments of the invention, screen scraping corresponds to parsing of the HTML in web pages. Preferably, the screen scraping conducted according to the present invention only processes the data of interest, and discards unwanted data and display formatting. A description of screen scraping can be found at http://en.wikipedia.org/w/index.php?title=Screen_scraping&oldid=44863928, www.wikipedia.com; "Screen Scraping"; Mar. 22, 2006; page version ID no. 44863928, the entire disclosure of which is herein incorporated by reference.

To that end, the functionality of the present invention has wide applicability for generating a plurality of different documents hosted on one website, with a single-set of information entered into another unrelated website (or software application). It is a particular advantage of embodiments of the present invention to enable users to enter in (preferably) a single set of data to generate at least one and preferably a plurality of different documents with the same data.

One of skill in the art will appreciate that "website", according to some of the embodiments of the present invention, relates to one or more, and preferably a collection of associated webpages (e.g., URLs), each of which may be presented to the user directly, or as a response to a query posted by an API of an unrelated website/webpage.

It is worth noting that the API, particularly where it applies to obtaining data from a website, according to some embodiments of the present invention may be constructed/written using Java®, an object-oriented language, which is a general purpose programming language. Java applications called Java applets can be downloaded from a web server and operated on a client computer via a Java-compatible web browser (e.g., Microsoft Internet Explorer). Accordingly, one or more APIs according to some embodiments of the invention may operate as corresponding Java® applets to obtain date, through, for example, screen scraping (e.g., HTML/webpage parsing) or other data acquiring API. However, one of skill in the art will appreciate that embodiments of the present invention may be extended to create documents in other ways, using, for example, web services (alternative to http).

The exemplary described embodiments for NYC real-estate transactions relate to generating documents on a NYC website entitled, Automated City Register Information System (ACRIS). This system allows users to generate a single real-estate tax document at a time for a real-estate transactions—in particular, associated tax forms. However, since several tax forms are typically necessary for a real-estate transaction, a user must enter the same information each time for each form, and thus, waste a considerable amount of time doing so.

Accordingly, FIG. 1A is an overview of an exemplary system according to some of the embodiments of the present invention, for generating a plurality of documents with a single set of data (although multiple sets of data are also within the scope of some of the embodiments of the present invention). A particular application of some of the embodiments of the present invention is the generation of one or more predetermined legal documents for the ACRIS real-estate tax document system for New York City (NYC). Using such embodiments, real-estate transfer documents are hosted on a particular website (e.g., NYC ACRIS website), and are generated using an API associated with an unrelated first website. Such documents may include: a real property transfer tax return, real-estate transfer tax return, a real property transfer report, as well as, deeds and affidavits, as well as associated cover pages and the like (for example).

Using such a system, a user enters property transaction information on a first website which may then be used to generate tax forms on the remote, second (NYC) website. In some embodiments, one or more APIs may be used to automatically construct queries (e.g., http queries) for substantially (preferably) all the requested and/or necessary forms for a particular real-estate transaction entered by the user. Each query preferably relates to a specific task to call up particular documents and/or webpages/URLs, and to fill in input fields for those documents/webpages. It is a particular feature of some of the embodiments of the invention, that the queries simulate web-browser output produced when a user manually fills in forms on the second website.

Each query generates a particular response from the second website. Specifically, for each query posted by an API to a URL associated with the second website, the API receives a response from the second website, e.g., the output produced from the second website (in view of the current query). Each query generally includes information to be posted to the opened URL of the second website. Accordingly, upon one or more of the requested forms being completed, the forms may be saved (downloaded) to a server associated with the first website, the user's client computer, or other file storage area; e.g., file hosting website, other computer readable media (e.g., CD, DVD, compactflash, and the like). The saved forms may also be later modified/edited on the second website via the first website according to a similar API query/response model.

Figure 1B:
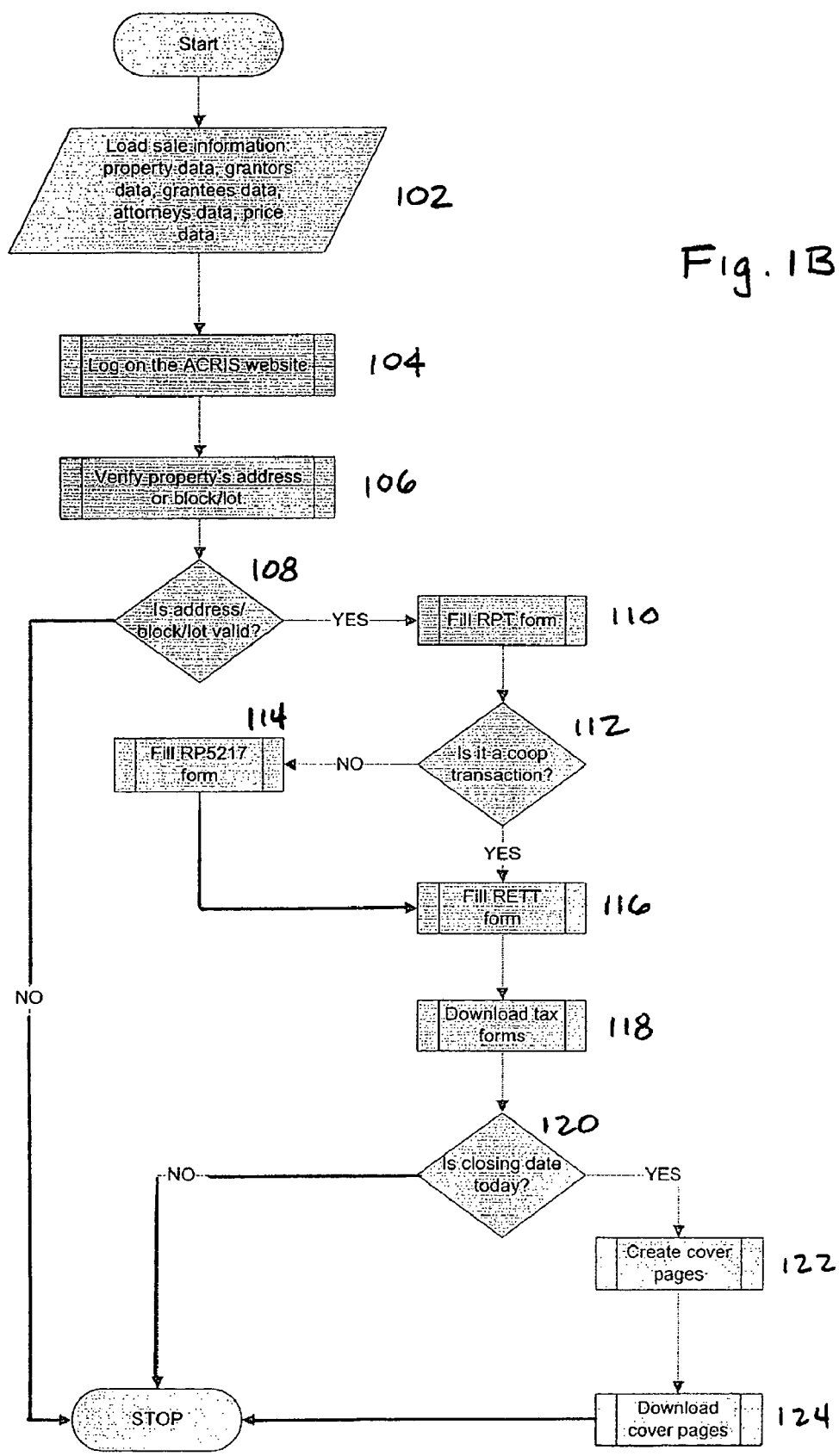
FIG. 1B is an API form creation flowchart of an overall process for creating forms according to some of the embodiments of the present invention.

FIG. 1B illustrates a general API form creation flowchart for creating forms on the second website according to some of the embodiments of the present invention. Typically, in a real-estate transaction in New York City, at least a RPT form, and a Real-Estate Transfer Tax form (RETT) are necessary. Sales/transaction information (e.g., property data, grantor(s) data, grantee(s) data, legal representation data, price data) for these documents may be entered (102) by the user at the first website. The one or more APIs associated with the first website then accesses the second website, which may include logging onto the second website (104). Such remote log-on may include creating a new account for the user, or using an existing account of the user.

The second website may verify the property address by obtaining lot/block information for the subject property of the transaction (106). If the second website cannot verify the property address (108), an error notification may be presented to the user at the first website, and the process halts (STOP). Such an error typically is the result of a clerical mistake of entering in the address data (i.e., the entered property data). If the property address is verified (108), the information entered on the first website, is then used to automatically fill in fields of a requested document, in this case a RPT form (110). In the illustrated embodiment, if the transaction is a coop transaction (112), then a RETT form is filled out as well (116).

However, if the transaction is not a coop transaction, then in addition to the RETT form, a Real Property Transfer Report (RP5217) form is automatically filled out by the system (114). The completed forms may then be downloaded from the second website to the first website and/or client computer (118). If the closing date is the day that the documents are generated, cover pages for the documents may be generated (122) and alternatively downloaded to the first website and/or client computer (124).

As can be seen in the process flow of FIG. 1B (for example), some embodiments of the present invention, based on information input by a user for a particular transaction, generate the appropriate forms necessary for a particular transactions. This is evident, for example, in view of step (112). In this step, the system determines whether the transaction is a coop transaction based on information entered by the user. If the transaction is a coop transaction, the system does not generate form RP5217, but generates a RETT form. If the transaction is not a coop transaction, then the system generates both an RP5217 form and a RETT form. This is in contrast to, for example, the ACRIS website, in which a user would have to decide or know that if the transaction is a coop transaction, that an RP5217 form is not necessary.

Figure 2A:
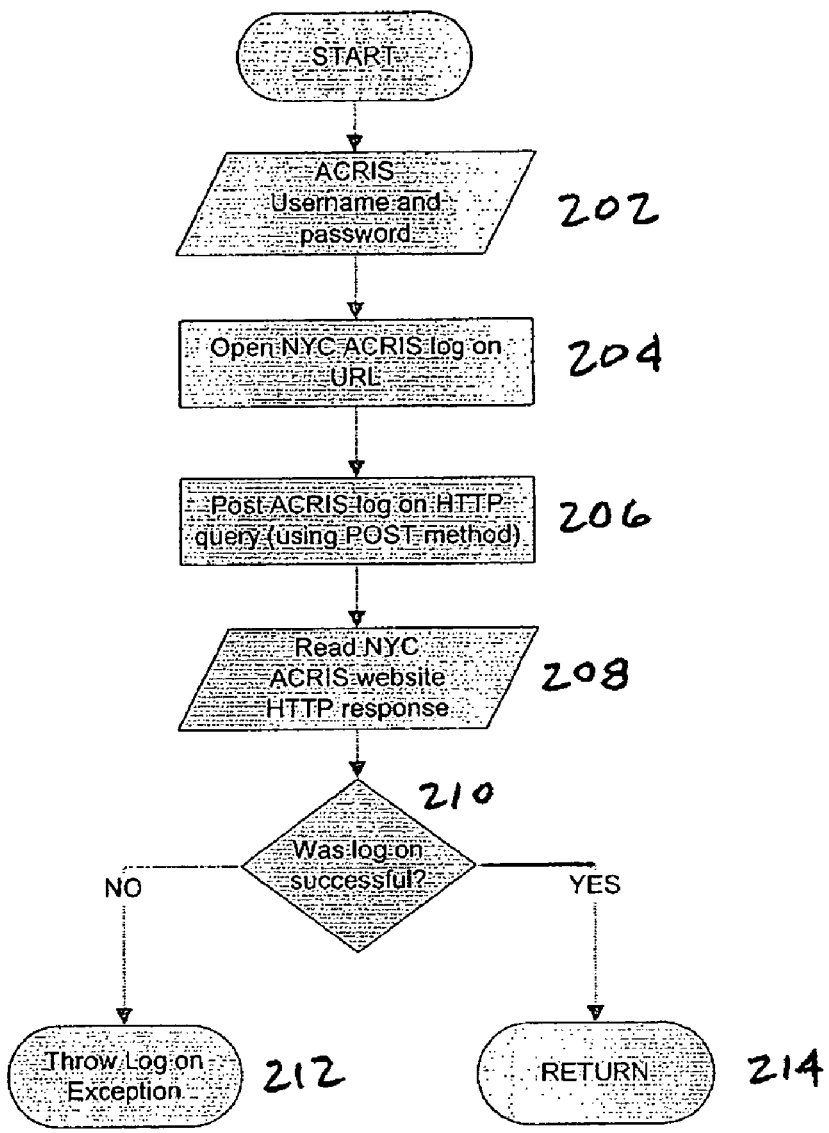
FIG. 2A an API log-on subroutine flowchart for logging onto a second website from a first website according to some of the embodiments of the present invention.

FIG. 2A is an API log-on subroutine flowchart for logging onto the second website, e.g., the ACRIS website (see step 104, FIG. 1B) from the first website using a previously created account (e.g., previously established user name and password) and includes steps 202-214 as illustrated. As shown, the second website log-on (ACRIS log-on) URL is opened (204), and a log on query is posted to the URL (206) with the known account information (202), and a response is read (208). A determination (210) is made in view of the information contained in the response to determine if the log-on was successful; if so (214), the process returns to the next step after step 104 in FIG. 1B. If not, an exception occurs, which may be an error notification displayed to the user (212).

Figure 2B:
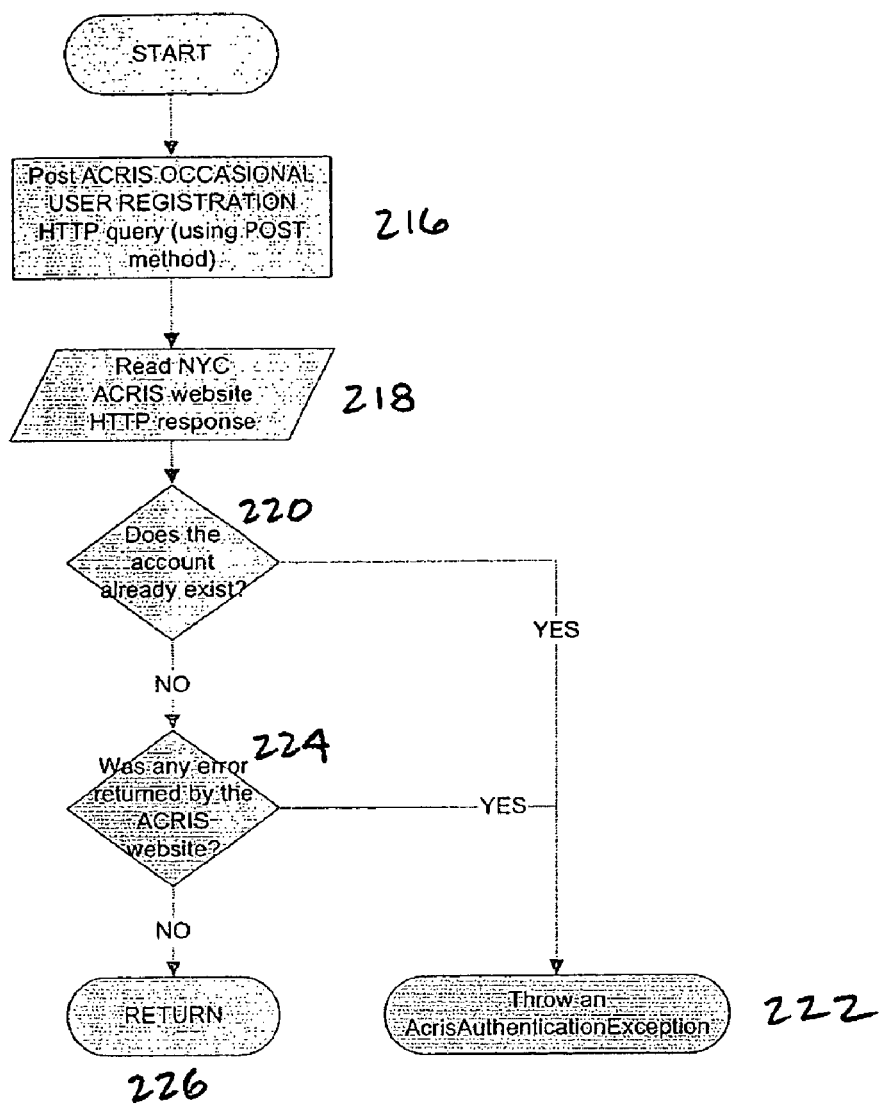
FIG. 2B is an API new account subroutine flowchart according to some embodiments of the present invention.

If a new account is required (i.e., the user does not have a user name and/or password) for the second website, a new account for the second website may be established. An example of such an API subroutine flowchart is shown in FIG. 2B. At step 204 (FIG. 2A), instead of entering in username and password information, a query is posted to the log-on URL of the first website to create a new account (216). In the NYC ACRIS (second) website example, the posted query would establish that the new user account would be for an occasional user. According, a response is read (218). A determination is made (220) to determined whether an account for the user already exists based on the read response. If so, an authentication exception is returned (222). If not, another determination may be made to determine if any error was returned by the second website (224). If errors exist, the authentication exception is returned (222); if not, the process returns (226) to the next step in FIG. 1B.

Figure 2C:
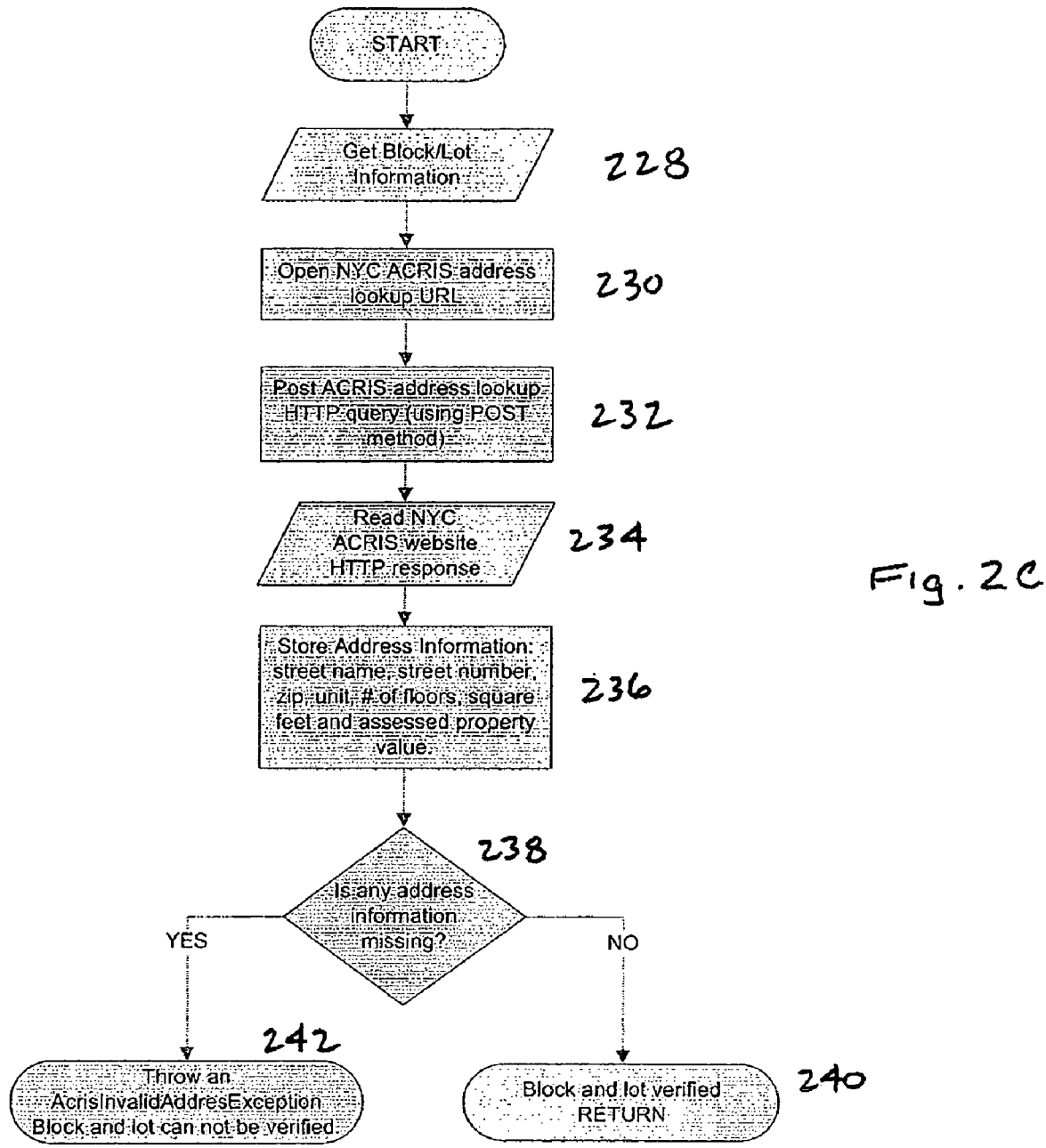
FIG. 2C is an API property address verification subroutine flowchart for verifying a property address according to some of the embodiments of the present invention.

FIG. 2C is an example of an API address verification subroutine flowchart, which is used to obtain the address information for the property of the real-estate transaction from lot/block information, as well as verifying that lot/block information input by the user corresponds to an address. The block/lot information are obtained (228) from the user on the first website. An address lookup URL (230) is then opened, and the block/lot information is posted in a query to the URL (232) and a response is read (234). The response corresponds to an address for the block/lot information, and may include one or preferably several or all of: street name, street number, zip, unit number, number of floors, square feet and property value. This address information may then be stored in a database corresponding to at least one of the first website (236), and second website (or client application) for later use in posted queries to fill out documents. A determination may then be made as to whether any address information is missing (238)—i.e., does a property exist for the inputted lot/block information. If information is missing, then an invalid exception is indicating that the block and lot cannot be verified (242) is presented to the user. Otherwise, the process is returned to the next step in FIG. 1B.

Figure 2D:
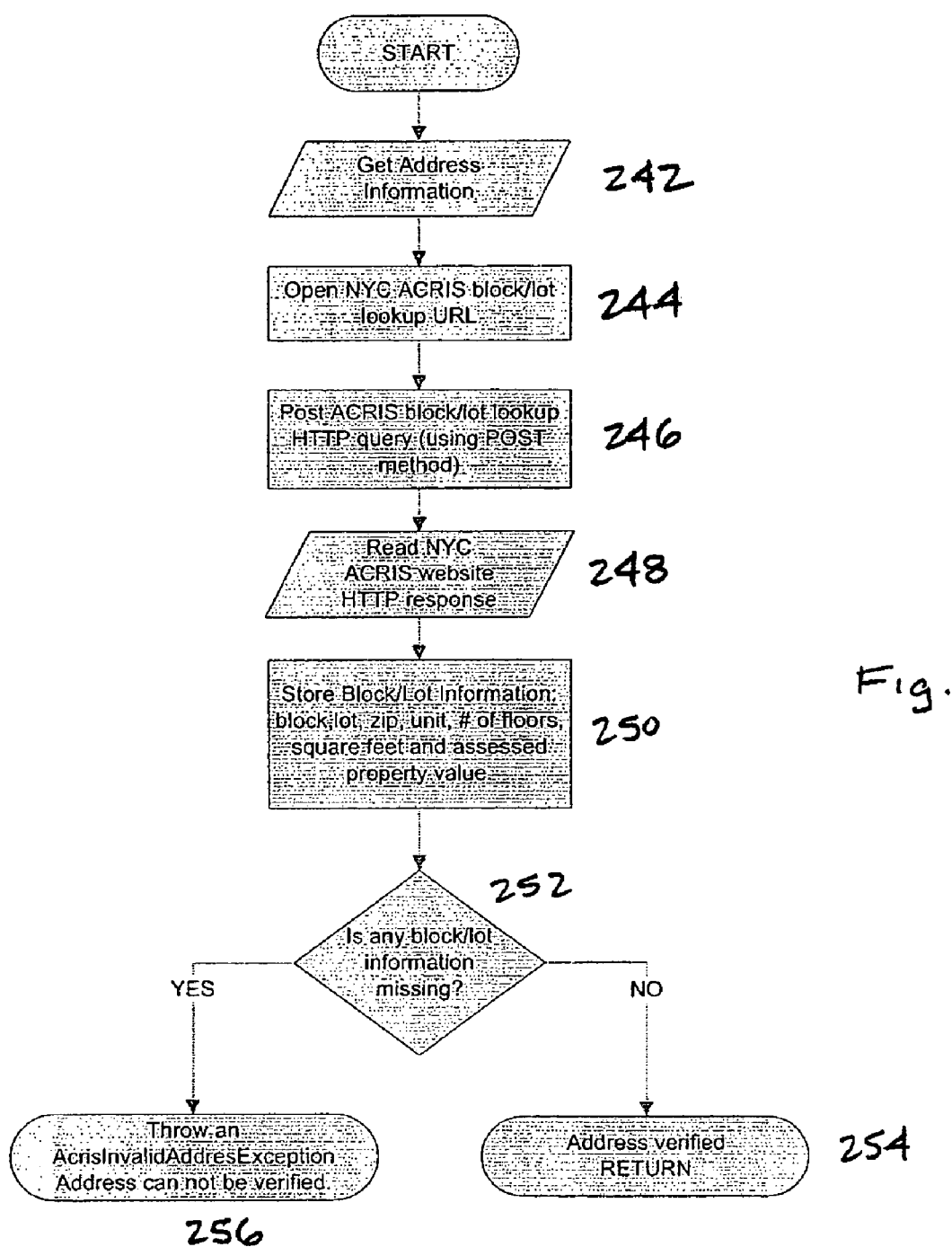
FIG. 2D is an API block and lot verification subroutine flowchart according to some embodiments of the present invention.

FIG. 2D is an API block and lot verification subroutine flowchart. This subroutine checks to see if address information input by the user on the first website corresponds to a known block and lot. Accordingly, the block/lot lookup URL is opened (244) and the address information (242) is posted (246) to the URL. The read response will include the block/lot information for the given address (248). The block/lot information, as well as any other associated address information may then be stored (250). A determination may then be made (252) whether the read response includes missing information—i.e., the block/lot URL didn't return the required information. If information is missing, an invalid address exception is presented to the user (256), otherwise, the address is considered verified and the process returns to the next step in FIG. 1B.

Figure 3A:
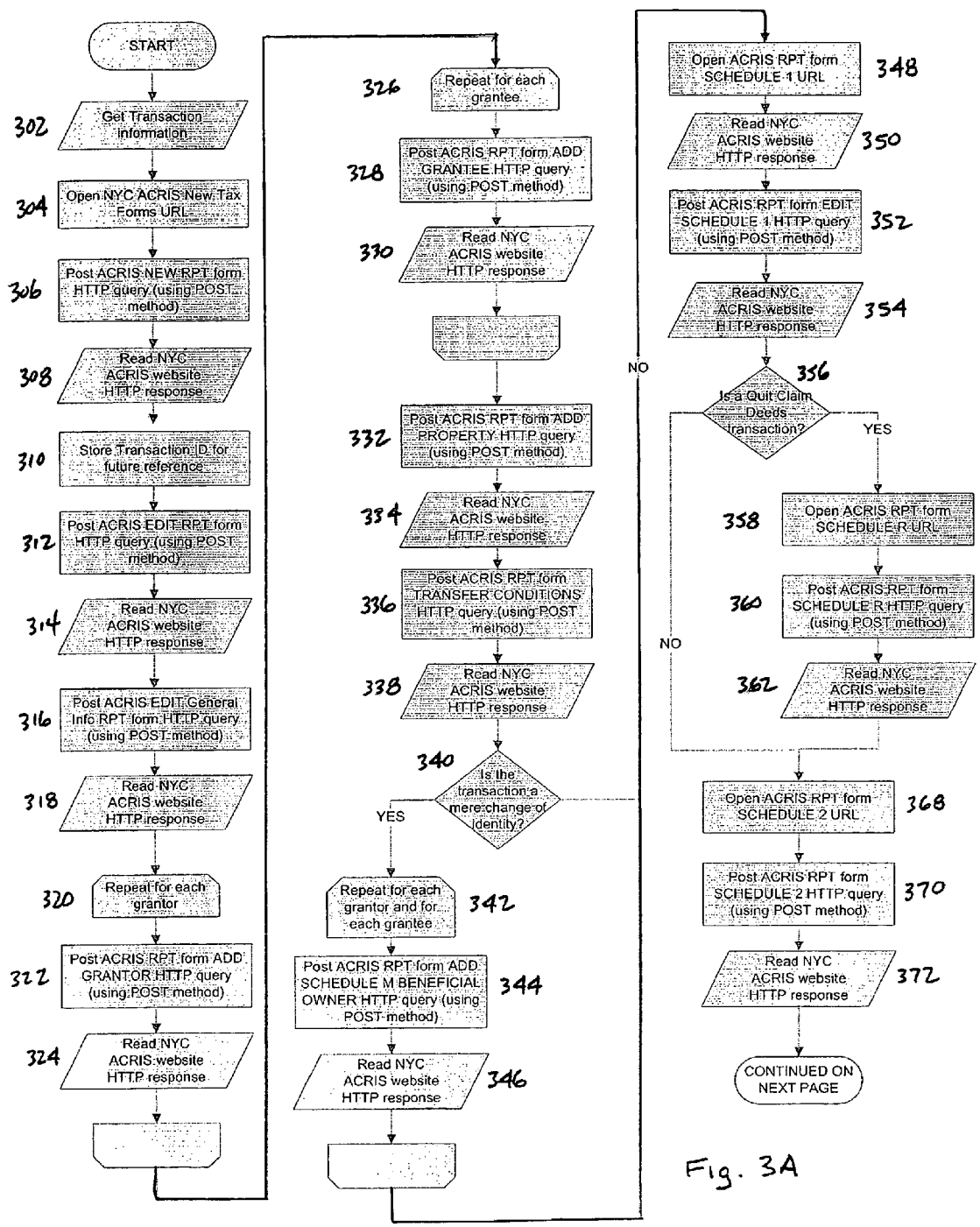
FIGS. 3A-3B is an API form creation flowchart for creating a real-property transfer tax return (RPT) according to some of the embodiments of the present invention.
Figure 3B:
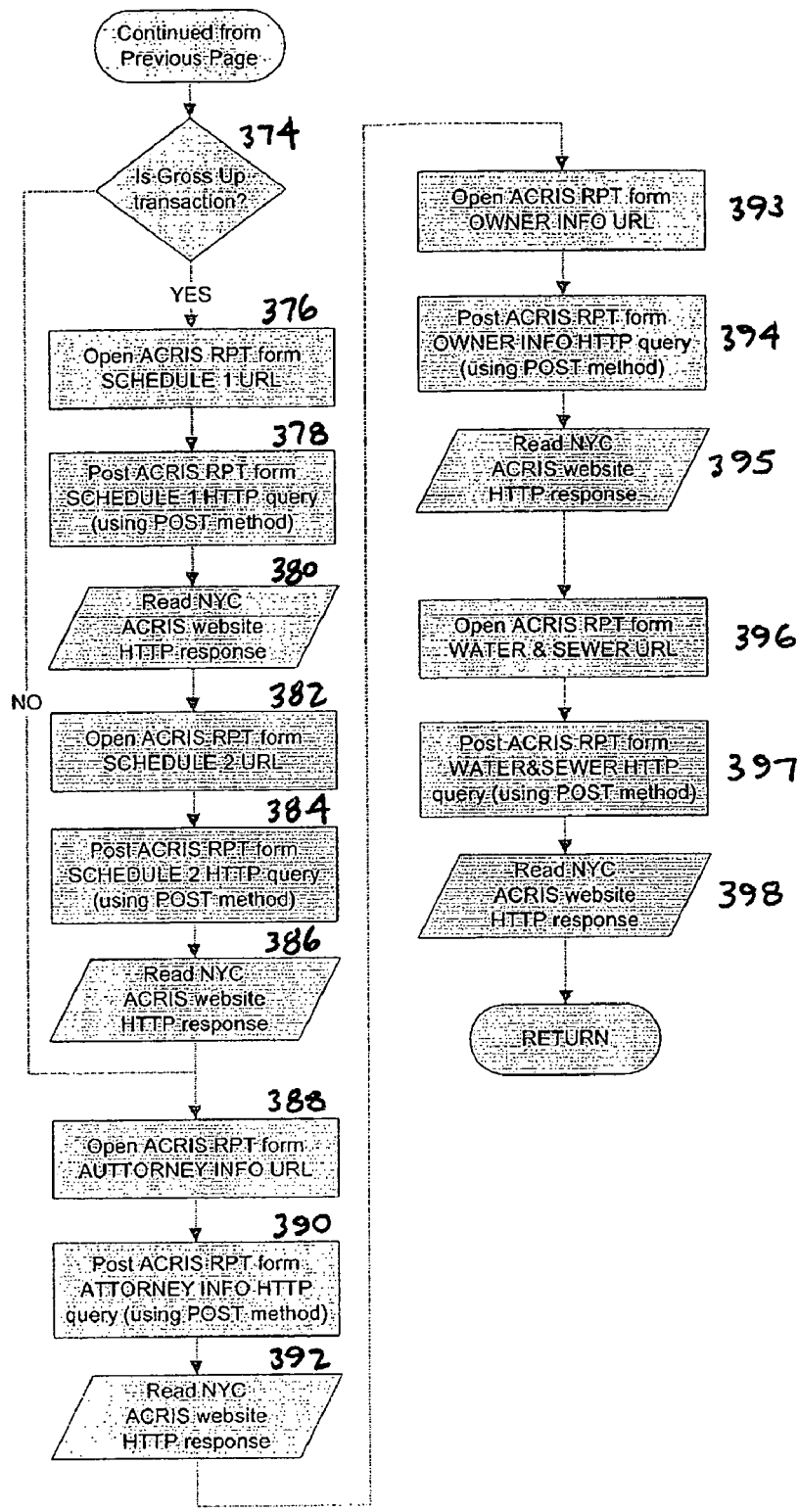

FIGS. 3A and 3B is an API form creation flowchart for creating an RPT form according to some of the embodiments of the present invention. As illustrated, the transaction information is obtained (e.g., either via user input or stored information previously entered by a user) (302) and a URL associated with the second website (e.g., NYC ACRIS New Tax Forms URL) for the RPT form is opened (304). The API posts a request for a new RPT form query (306) to the second website and reads the response (308), which may be a webpage with fields for the RPT form. This response may include an identification code, e.g., a Transaction ID (310), so that the forms and/or transaction information may be obtained at a later time for download, saving, and/or editing.

Thereafter, a query may then be posted to edit the RPT form (312), and the response read (314). A query may then be posted to edit the general information to be included with each RPT form (316), and the response read (318). Accordingly, for each grantor from the transaction information (320), an add grantor query (322) may be posted, each time with corresponding information for each particular grantor, and a response to each query is read (324). A similar query is posted for each grantee (steps 326-330).

To add the property information to the RPT form, an add property information query may then be posted with the property information for the transaction, which may include at least one of the block/lot and address information (steps 332-334), as well as transfer conditions query for the transaction (steps 336-338), in which particular information for conditions related to the transfer of the property in the current transaction may be included in the RPT form.

The process continues where a determination (340) may be made to determine if the transaction is simply a change in identity of a grantor. If so, then a Schedule M document is required, and a query for adding for a Schedule M form is posted for each grantor and grantee (steps 342-346), and a corresponding response is read. If the transaction is more than a change in identity of a grantor, then a Schedule 1 document is required and a URL for a schedule 1 form is opened, and the schedule 1 is edited by posting an edit query of the schedule 1 form (steps 348-354).

Some embodiments of the present invention also enable one or more forms to be automatically changed based on a special condition. This is in contrast to what must be done on the ACRIS website, where one must know what forms must be used or changed based on the special condition. Such a special condition is shown, for example, in step (356). Here, a determination (356) may be made to determine if the transaction is a quit-claim deed transaction. If the transaction is not a quit-claim deed transaction, a Schedule 2 form is typically required and thus the URL for the schedule 2 document is opened, and a Schedule 2 query is posted (steps 368-372). If the transaction is a quit claim deed transaction, a Schedule R form typically must be generated and a URL is opened and a schedule R query is posted (steps 358-362), in addition to generating a Schedule 2 document.

Another example of a special condition can be found in step (374). Here, a determination may then be made (374) as to whether the transaction is a Gross-Up transaction, upon which a Schedule 1 form is typically required (Steps 376-380) and a Schedule 2 form is typically required (Steps 382-386). If the transaction is not a Gross-Up transaction, then the above-noted steps are skipped and the process continues with step 388.

The process preferably continues with filling in the legal representation fields of the RPT form, by opening an Attorney Info ULR (388), and posting the information in a query (390-392). In addition, owner information fields of the RPT form may be filled in by opening an Owner Info URL (393) and posting owner information in a query (394-395). Water and Sewer information may also be added (396-398). Thereafter, the process returns to step 112 in FIG. 2.

Figure 4:
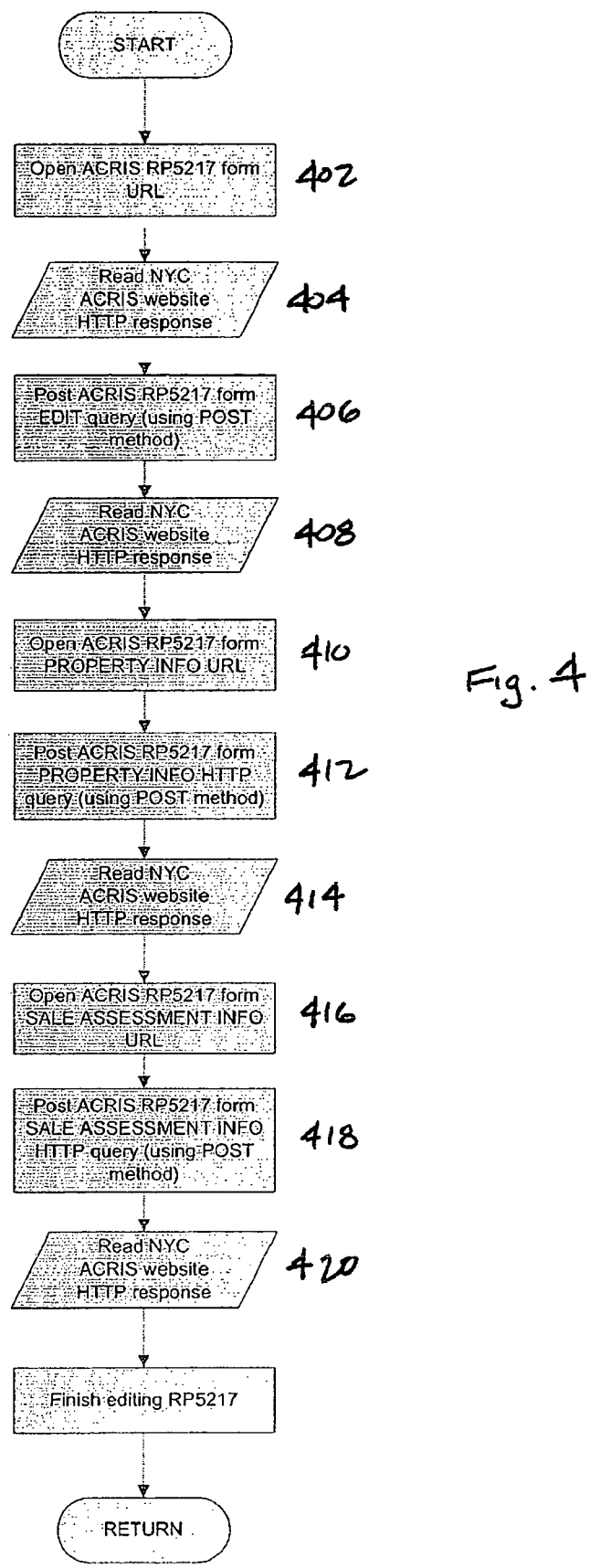
FIG. 4 is an API form creation flowchart for creating a real-property transfer report (RP5217) according to some of the embodiments of the present invention.

FIG. 4 illustrates the API RP5217 form creation subroutine flowchart for the generation of form RP5217 in step 114 of FIG. 2. The outlined process may include: opening an RP5217 form URL (402), reading a response (404), posting an edit query thereto (406) and reading a response (408), opening an RP5217 form Property Info URL (410) and posting the property information in a query (412) and reading the response (414), opening RP5217 form Sale Assessment Info URL (416) and posting sale assessment information to the URL (418) and reading the response (420), which finishes editing of the RP5217 (according to some embodiments). The process is then returned to the next step in FIG. 2.

Figure 5:
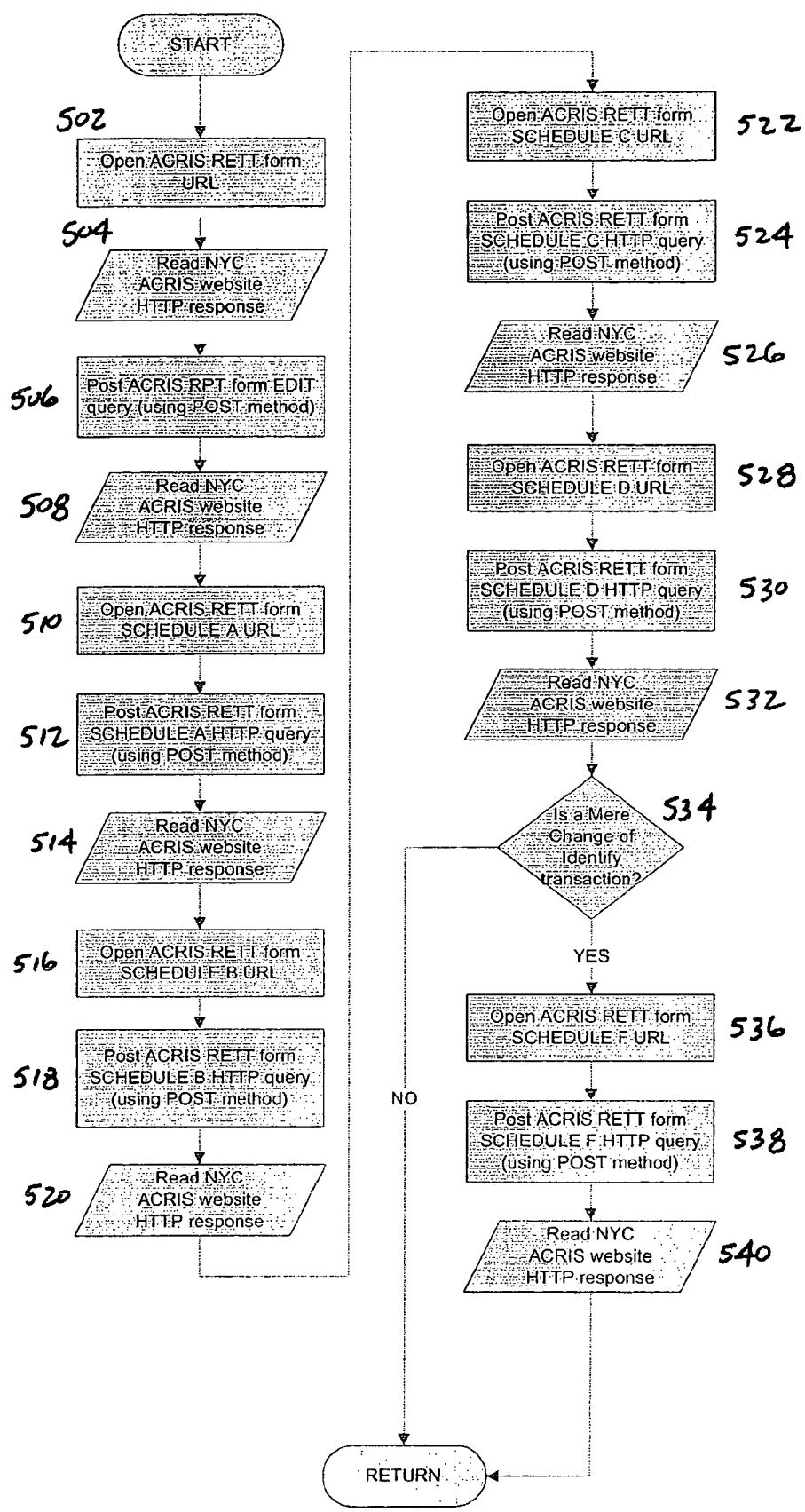
FIG. 5 is an API form creation flowchart for creating a real-estate transfer tax return (RETT) according to some of the embodiments of the present invention.

FIG. 5 illustrates the API RETT form creation subroutine flowchart for the generation of a RETT form (step 115, FIG. 1B). The outlined process may include opening a RETT form URL (502), reading the response (504), posting an EDIT query (506) and reading the response (508). The same is accomplished for associated Schedules A, B, C and D (steps 510-532. The process then returns to step 118 (FIG. 2). If the transaction is a Change of Identity transaction, then prior to returning to step 118, a Schedule F form is generated in the same manner as Schedules A-D (534-540).

Figure 6:
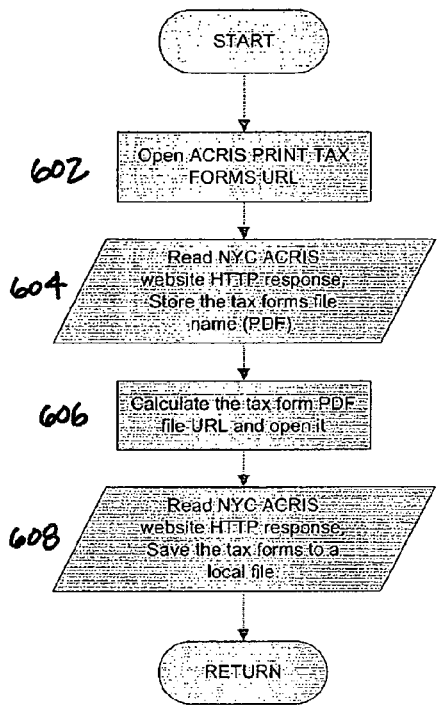
FIG. 6 is an API forms download subroutine flowchart for downloading generated forms according to some of the embodiments of the present invention.
Figure 8:
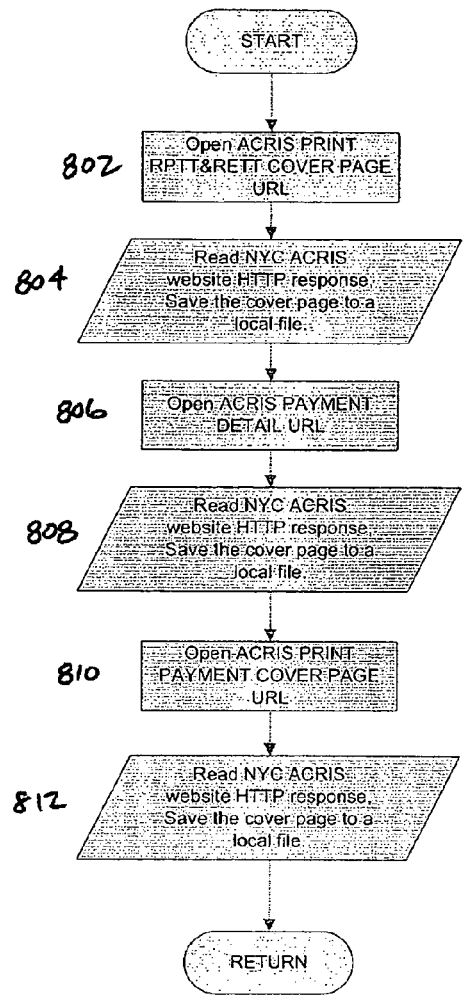
FIG. 8 is an API cover page download subroutine flowchart according to some of the embodiments of the present invention.
Figure 7:
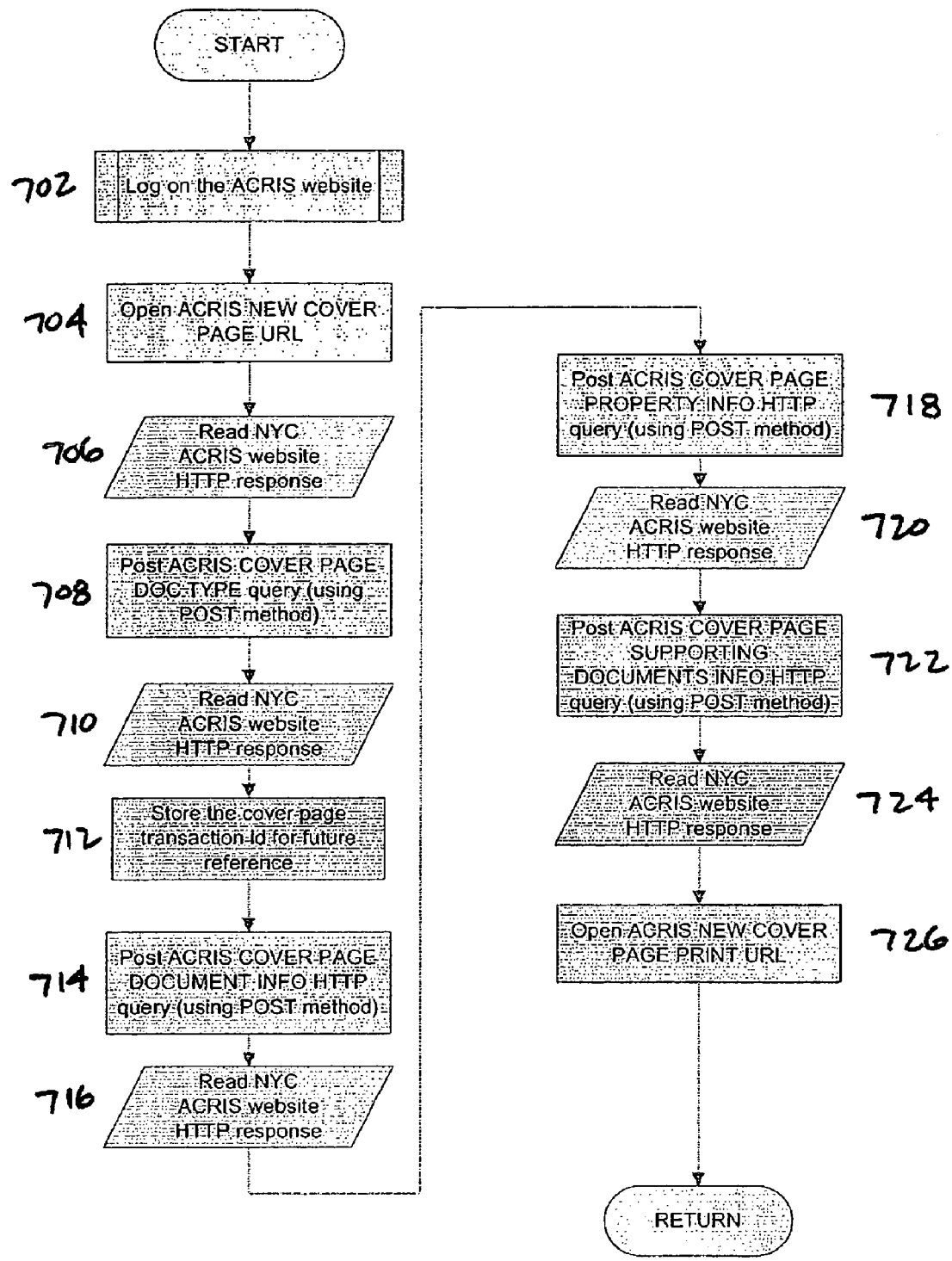
FIG. 7 is an API cover page creation subroutine flowchart for creating cover pages for generated forms according to some embodiments of the present invention.

FIGS. 6-8 represent supporting API subroutine flowcharts for associated processes. For example, FIG. 6 is an API form download subroutine flowchart for performing at least one of storing, and saving the generated forms to a local file. In particular, a print tax form URL is opened (602) and the response is read and the forms are stored (604). A calculate tax form URL is opened (606) and the response (608) is read, which may include saving the generated forms to a local file on the user's computer.

FIG. 7 is an API cover page creation subroutine flowchart in which cover pages for documents generated by some of the embodiments of the present invention may be accomplished. In the exemplary embodiment of a real-estate transaction in NYC, upon the closing date of the transaction occurring after the date in which the one or more documents are generated, the user, through the first website, logs onto the second website (702), the URL for a new cover page is opened (704), and a response read (706). A query is posted for the cover page type for the particular generated form (e.g., RPT form) (708). The response is read (710), which may be a webpage with fields for entering in information for the cover page. A transaction ID for the cover page may be contained in the response which may be stored for future reference (712). Thereafter, the cover page document info query is posted and a response is read (714-716), and property information may be posted (718-720). In addition, the information corresponding to the supporting documents (supporting documents information) may be posted (722-724). The cover page may then be printed (726).

FIG. 8 corresponds to an API download subroutine flowchart, which allows the user via the first website to download one or more cover pages associated with one or more of the generated forms. For example, a print cover page (e.g., for the RPTT and RETT forms) URL may be opened, and the read response (802-804)—a generated cover page—may be saved to a local file on the user's computer. A payment detail URL may then be opened (806), and the read response (cover page) may also be saved to a local file (808). A payment cover page URL may also be opened and the document received in the read response may be saved to a local file (810-812).

Figure 9:
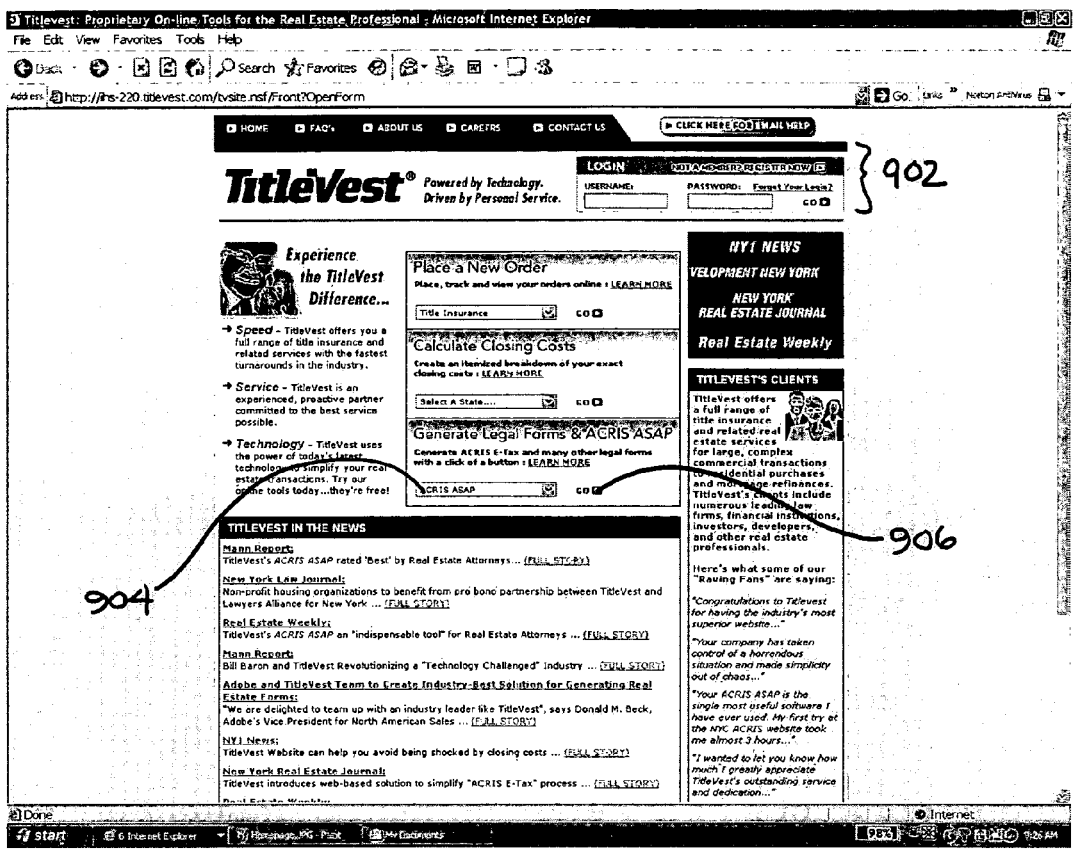
FIG. 9 is a screenshot of home/log-on webpage of a first website for creating and/or generating documents on a second website according to some embodiments of the present invention.

FIGS. 9-14 represent exemplary, illustrative screenshots for the first website according to some embodiments of the present invention. To that end, FIG. 9 illustrates a screenshot of a webpage of the first website. As shown, a user may have an established account on the first website, which allows the user to input user name and password information in login area 902, or create a new account. As can be seen, legal forms for a real-estate transaction may be generated. More particularly, the legal forms that may be generated by the NYC ACRIS website may be produced by selecting that feature from pull-down menu 904 and clicking on a button (906).

Figure 10:
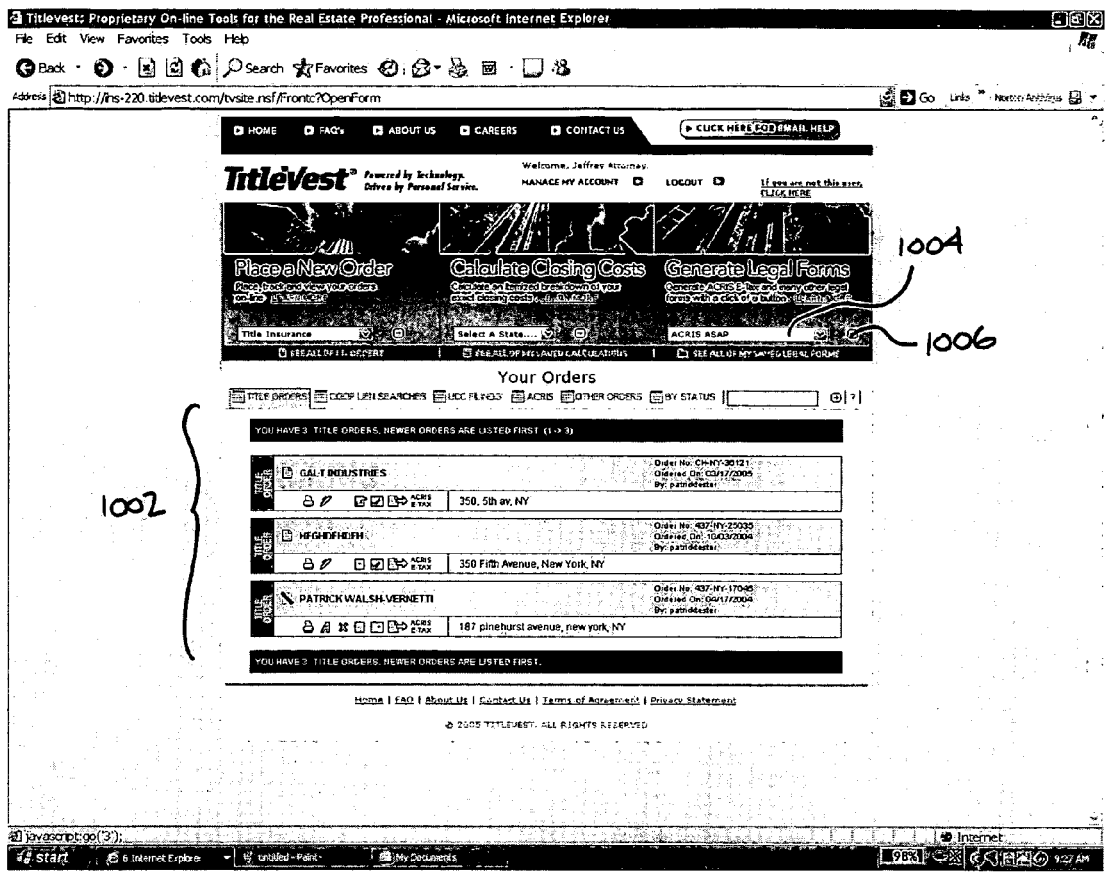
FIG. 10 is a screenshot of another webpage of the first website, illustrating a list of prior placed title orders of a user for real estate transactions according to some embodiments of the present invention.

Logging onto the first website may produce a URL as shown in the screenshot shown in FIG. 10. Existing title orders are displayed in area 1002, which include links for editing the forms associated with a particular transaction. New forms for a new transaction may be generated by the pull-down menu (e.g. "ACRIS ASAP") (1004) and clicking on button 1 (1006).

Figure 11:
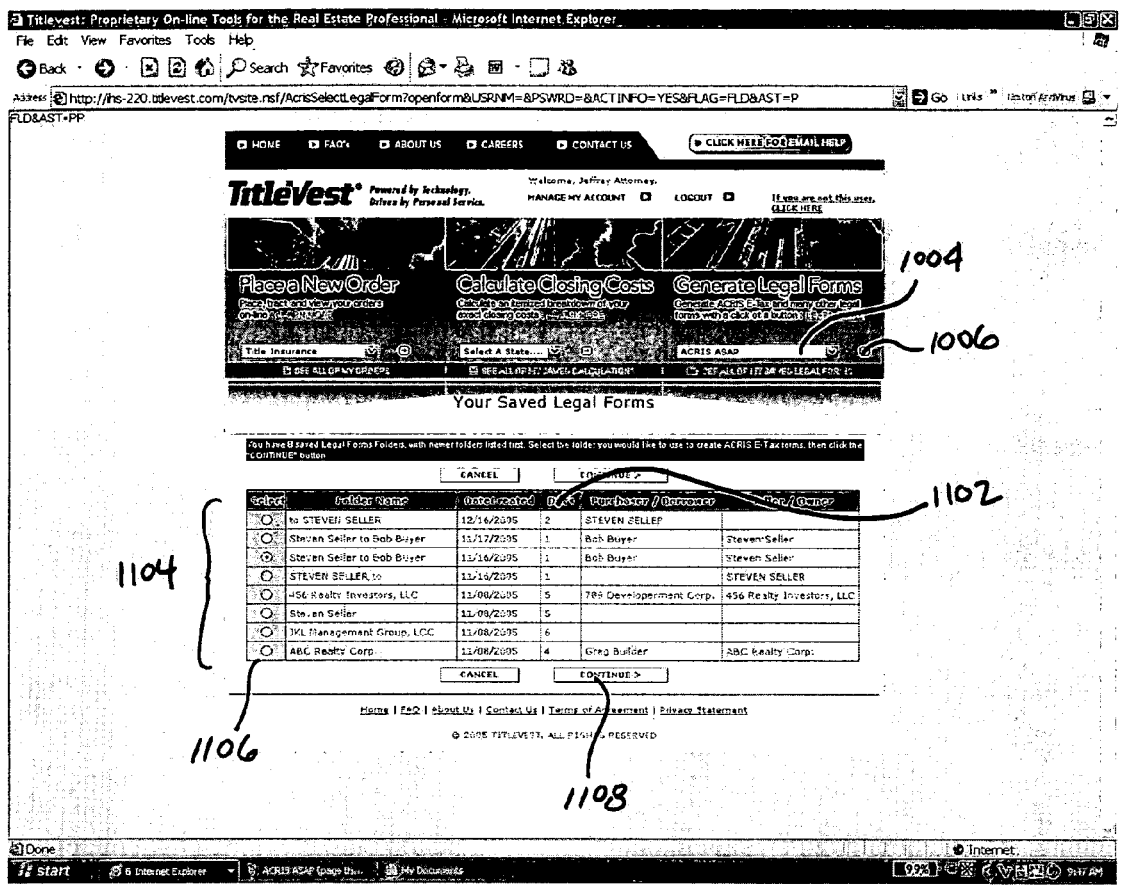
FIG. 11 is a screenshot of another webpage of the first website, illustrating a list of saved legal document forms of a user for real estate transactions according to some embodiments of the present invention.
Figure 12:
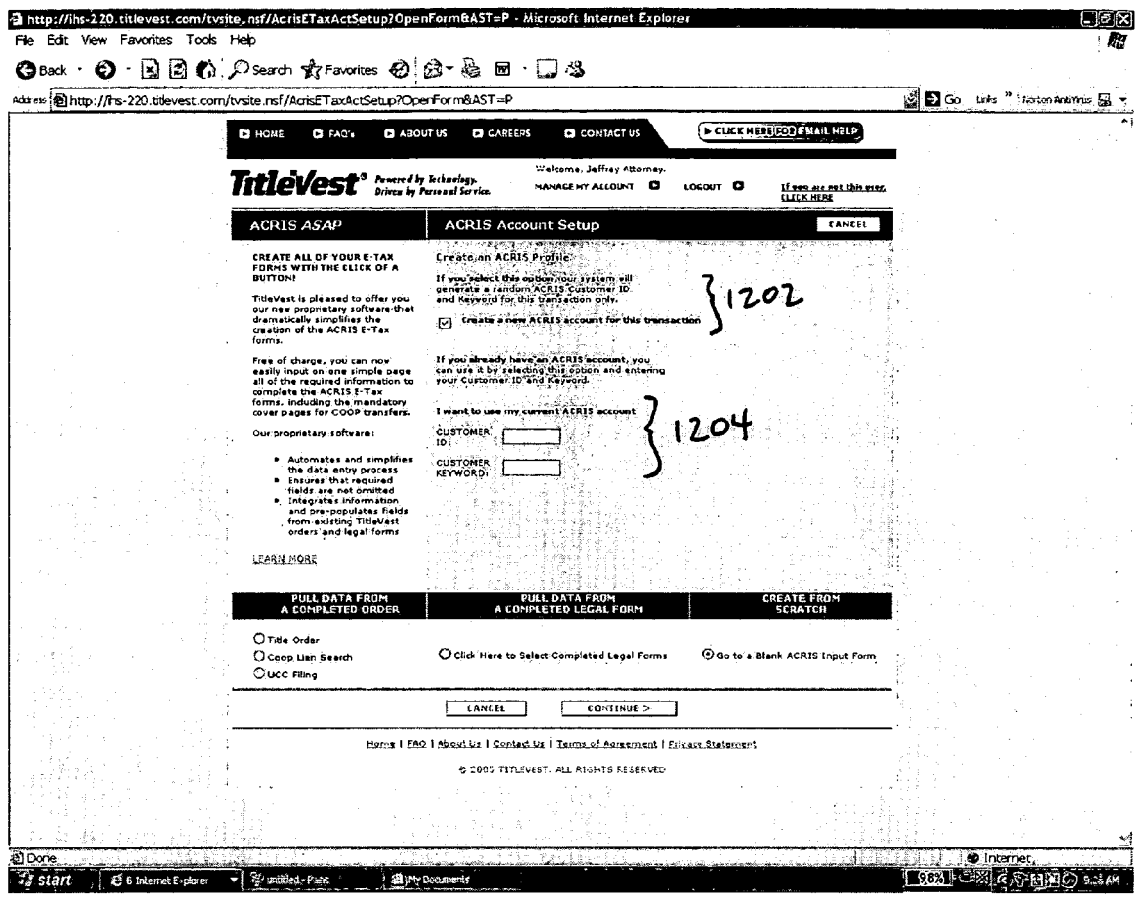
FIG. 12 is a screenshot of a webpage for initiating the generation of legal forms on the second website according to some embodiments of the invention, illustrated an account setup screen for a second website.

FIG. 11 represents a URL which displays a plurality of saved legal forms 1102 associated with particular folder 1104. Each may be selected by clicking on the particular select area (1106), and clicking on a continue button (1108). FIG. 12 is a URL for the first website associated with logging onto the second website. The user may create a new account for the user on the second website (1202), or enter in a user name/password (1204) for an existing user account on the second website.

Figure 13A:
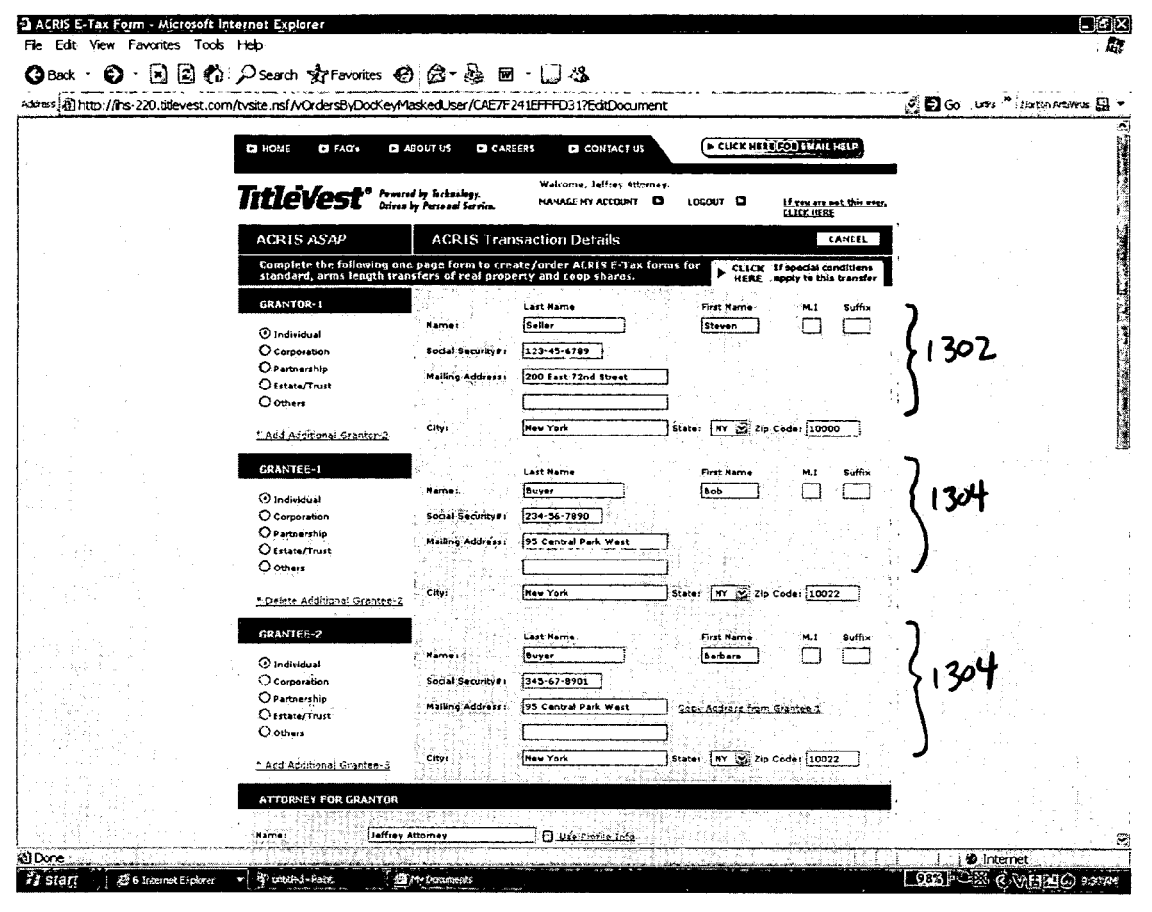
Figure 13B:
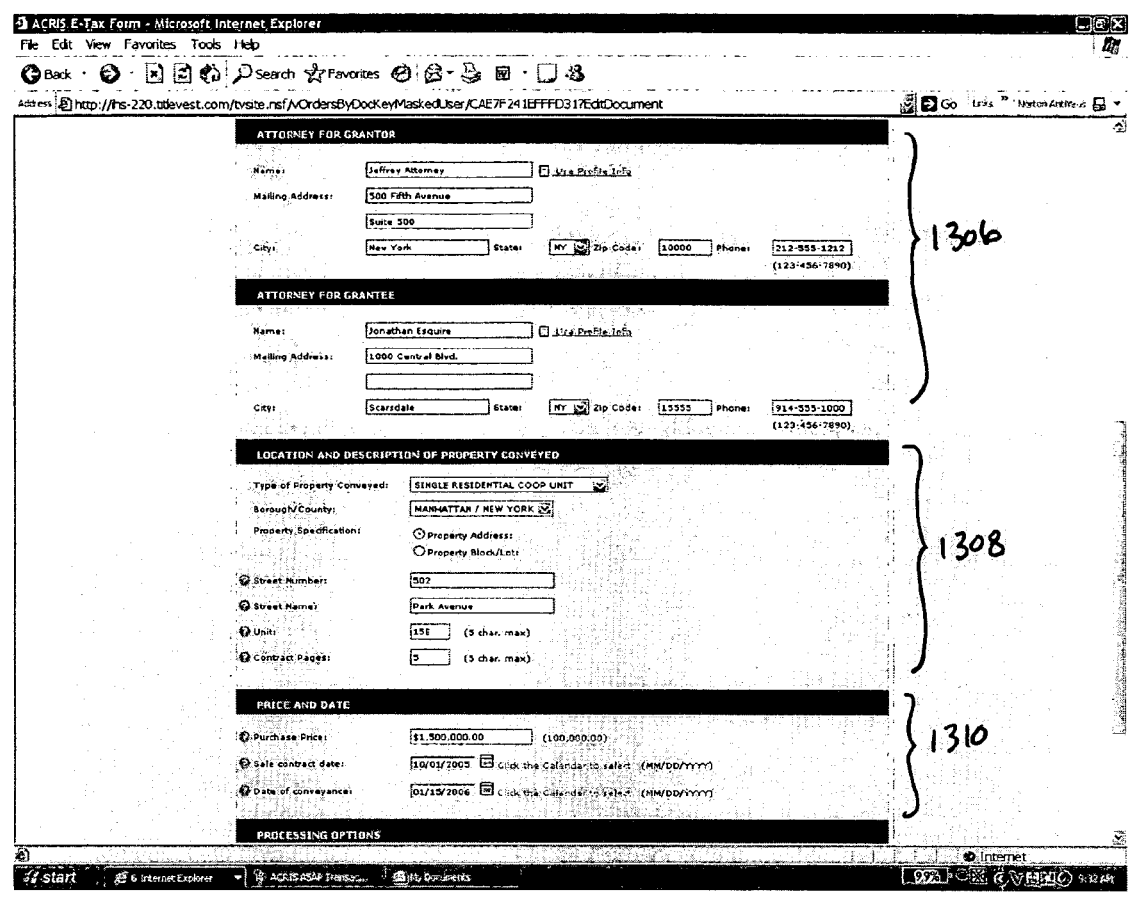
Figure 13C:
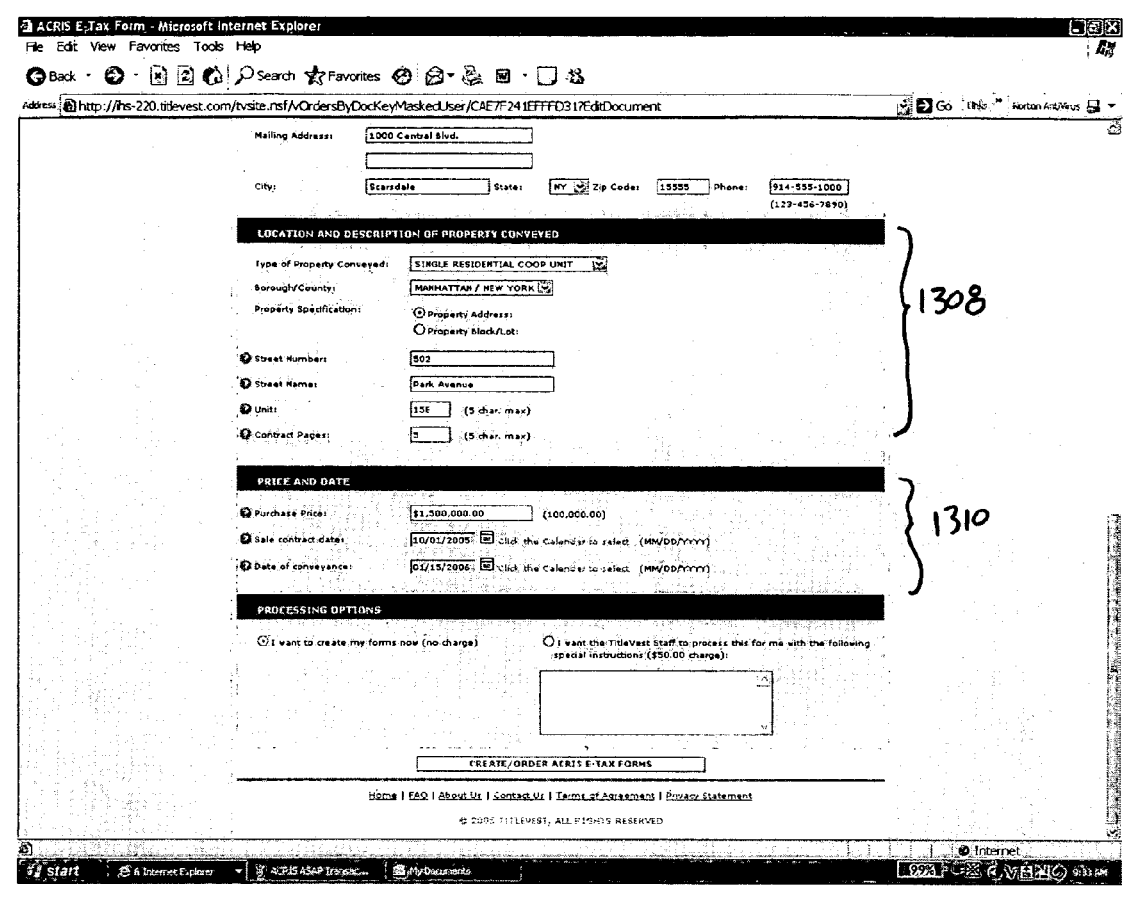

FIGS. 13A-C, represent an input URL associated with the first website, where a user inputs information for a real-estate transaction, including, for example, grantor information (1302), grantee information (1304), legal representation information (1306), location and/or description of the subject property (1308) as well as price, contract and closing date (1310).

Figure 14:
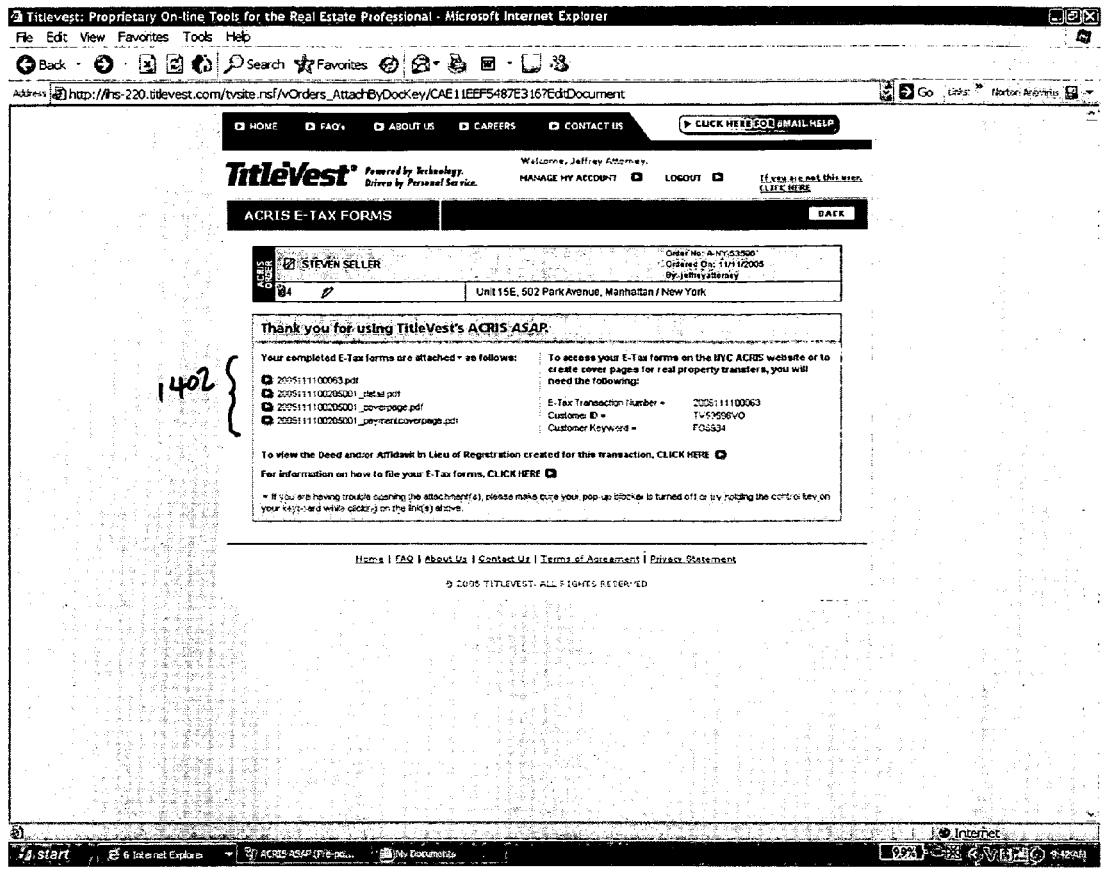
FIG. 14 is screenshot of a webpage from the first website illustrating a graphical representation of the resulting legal forms generated on the second website according to some embodiments of the present invention.

FIG. 14 is screenshot of a webpage from the first website illustrating a graphical representation of the resulting legal forms generated (1402) on the second website according to some embodiments of the present invention. The document names listed may be links which allow the generated forms to be downloaded to a users computer.

Having now described a few embodiments of the invention, it should be apparent to those skilled in the art that the foregoing is merely illustrative and not limiting, and it should be understood that numerous changes in creating and operating such systems and methods may be introduced without depart- ing from the true spirit of the invention as defined in the appended claims. In particular, the disclosed functionality of the above described embodiments may be applied in the generation of documents between websites.

What is claimed is:

1. A method for generating a real-estate transfer document for a real-estate transaction which allow a user to input a single set of information via a first website for generating plurality of documents associated with the real-estate transaction on a predetermined second website unassociated with the first website, the method comprising the steps of:

receiving from the user information related to the real-estate transaction, wherein an application program interface (API) is associated with the first website;

determine which documents are necessary for the real estate transaction, based on the data received from the user;

using the API, submitting a query from the first website to the second website, based on at least a portion of the received information, wherein the second website is configured to generate the real-estate transfer document for the real-estate transaction;

verifying at least a portion of the received information by the second website, said second website sending transmitting verified information to the first website, or, transmitting error notification to the first website when the portion of the received information cannot be verified by the second website;

opening plurality of URLs associated with the second website based on the submitted query by the first website, wherein each one of the URL is associated with a particular task for generating a particular real-estate transfer document of the said plurality of real estate-transfer documents on the second website;

posting at least a portion of the user provided information and the verified received information to each one of the opened URLs;

generating plurality of real-estate transfer documents associated with each of the opened URL on the second website using the posted information on each one of the opened URL; and, transmitting the generated real-estate transfer documents to the first website;

providing the received real-estate documents to the user.

2. The method according to claim 1, further comprising storing the generated real-estate transfer document on a server associated with the first website.

3. The method according to claim 2, further comprising using the API, editing the stored real-estate transfer document on the second website.

4. The method according to claim 1, further comprising generating a cover page for the generated real-estate transfer document.

5. The method according to claim 1, further comprising downloading the generated real-estate transfer document to a user's computer.

6. The method according to claim 1, further comprising using the API associated with the first website, automatically constructing and submitting the query for a specific real-estate transfer document to be generated based at least on a portion of the received information.

7. The method according to claim 1, further comprising verifying the received information on the second website.

8. The method according to claim 1, wherein the submitting step further comprises accessing the second website using a username and a password assigned to the user.

9. The method according to claim 1, wherein the second website is in communication with the first website but is unrelated to the first website.

10. A method for generating a plurality of real-estate transfer documents for a real-estate transaction which allow a user to input a single set of information via a first website for generating plurality of documents associated with the real-estate transaction on a predetermined second website unassociated with the first website, the method comprising the steps of:

receiving from the user information related to a real-estate transaction, wherein an application program interface (API) is associated with the first website;

determine which documents are necessary for the real estate transaction, based on the data received from the user;

using the API, submitting a query from the first website to the second website, based on at least a portion of the received information, wherein the second website is configured to generate the real-estate transfer documents for the real-estate transaction;

verifying at least a portion of the received information by the second website, said second website sending transmitting verified information to the first website, or, transmitting error notification to the first website when the portion of the received information cannot be verified by the second website;

opening plurality of URLs associated with the second website based on the submitted query by the first website, wherein each one of the URL is associated with a particular task for generating a particular real-estate transfer document of the said plurality of real estate-transfer documents on the second website;

posting at least a portion of the user provided information and the verified received information to each of the opened URLs; and, generating the plurality of real-estate transfer documents associated with each of the opened URL on the second website using the posted information on each respective opened URL; and transmitting the generated real-estate transfer documents to the first website;

providing the received real-estate documents to the user.

* * * * *